US012027305B2

(12) United States Patent
Gautard et al.

(10) Patent No.: US 12,027,305 B2
(45) Date of Patent: Jul. 2, 2024

(54) OPENABLE CURRENT TRANSFORMER COMPRISING A FLEXIBLE MAGNETIC CORE

(71) Applicant: SOCOMEC, Benfeld (FR)

(72) Inventors: Dominique Gautard, Varennes Vauzelles (FR); Thierry Save, Coulanges les Nevers (FR); Vincent Begotto, St. Dizier (FR)

(73) Assignee: SOCOMEC, Benfeld (FR)

( * ) Notice: Subject to any disclaimer, the term of this patent is extended or adjusted under 35 U.S.C. 154(b) by 957 days.

(21) Appl. No.: 16/960,199

(22) PCT Filed: Dec. 21, 2018

(86) PCT No.: PCT/FR2018/053530
§ 371 (c)(1),
(2) Date: Jul. 6, 2020

(87) PCT Pub. No.: WO2019/135044
PCT Pub. Date: Jul. 11, 2019

(65) Prior Publication Data

US 2021/0065971 A1 Mar. 4, 2021

(30) Foreign Application Priority Data

Jan. 5, 2018 (FR) ........................................ 1850064

(51) Int. Cl.
*H01F 27/28* (2006.01)
*H01F 27/32* (2006.01)
(Continued)

(52) U.S. Cl.
CPC ....... *H01F 27/427* (2013.01); *H01F 27/2823* (2013.01); *H01F 27/324* (2013.01); *H01F 38/30* (2013.01); *H01F 2038/305* (2013.01)

(58) Field of Classification Search
CPC .................................................. H01F 27/2823
(Continued)

(56) References Cited

U.S. PATENT DOCUMENTS 3,747,036 A * 7/1973 Erdmann ............... G01V 3/081 336/84 R
4,200,767 A * 4/1980 Nomura ................. H10N 60/20 29/599

(Continued)

FOREIGN PATENT DOCUMENTS

CN 202153472 U 2/2012
EP 0469530 A1 2/1992

(Continued)

OTHER PUBLICATIONS

International Search Report and Written Opinion from PCT Application No. PCT/FR2018/053530, Apr. 26, 2019.

(Continued)

*Primary Examiner* — Ronald Hinson
(74) *Attorney, Agent, or Firm* — Workman Nydegger

(57) ABSTRACT

An openable toroidal current transformer is intended to close over at least one electrical conductor in which an electrical current to be measured circulates. The current transformer includes a magnetic circuit, and an electrically conducting coil wound around the magnetic circuit and electrically insulated from the magnetic circuit. The coil comprises a single winding or several distinct windings coupled in series. The magnetic circuit comprises a set of wires of magnetic material assembled in the form of a strand, allowing having uniform flexibility in all directions for the magnetic circuit.

16 Claims, 3 Drawing Sheets

(51) Int. Cl.
*H01F 27/42* (2006.01)
*H01F 38/30* (2006.01)

(58) Field of Classification Search
USPC .......................................................... 336/180
See application file for complete search history.

(56) References Cited

U.S. PATENT DOCUMENTS

| | | | | | |
|---|---|---|---|---|---|
| 5,235,488 | A | 8/1993 | Koch | | |
| 5,250,755 | A * | 10/1993 | Dinzen | H01B 7/0054 | 174/106 SC |
| 2006/0119460 | A1* | 6/2006 | Farmer | H01F 17/045 | 336/174 |
| 2006/0244437 | A1* | 11/2006 | Suquet | G01R 15/185 | 324/117 R |
| 2008/0211484 | A1* | 9/2008 | Howell | G01R 15/181 | 336/229 |
| 2010/0148907 | A1* | 6/2010 | Younsi | H01F 38/30 | 336/180 |
| 2014/0097924 | A1* | 4/2014 | Thorner | G01R 15/186 | 336/176 |
| 2016/0116506 | A1* | 4/2016 | Ringsrud | G01R 15/205 | 324/252 |

FOREIGN PATENT DOCUMENTS

| | | | |
|---|---|---|---|
| EP | 0533563 | A1 | 3/1993 |
| EP | 0999565 | A1 | 5/2000 |
| FR | 2764429 | A1 | 12/1998 |
| JP | H08250351 | A | 9/1996 |

OTHER PUBLICATIONS

Search Report from corresponding FR Application No. 1850064, Sep. 26, 2018.

* cited by examiner

OPENABLE CURRENT TRANSFORMER COMPRISING A FLEXIBLE MAGNETIC CORE

BACKGROUND OF THE INVENTION

The invention relates to a device for measuring an electrical current, and more particularly a measuring device including a current transformer equipped with a flexible toroidal magnetic circuit which can be opened and closed over a cable in which the current to be measured circulates.

A Rogowski toroid is an air-core electrical device able to measure alternating current or high-speed current impulses. As illustrated in FIG. 1, a Rogowski winding 1 conventionally consists of an electrical wire 2 comprising a first portion 3 wound helically around a sheath 4, and a second portion 5 secured to a first end 6 of the first portion 3, the second portion 5 of the wire 2 passing through the helical winding 3, and therefore the sheath 4, along its winding axis over the entire axial length of the helical winding until a second end 7 of the first portion 3 of the wire 2, so that the two electrical terminals 8 and 9 of the electrical wire 2 are at the same end of the Rogowski winding 1.

The Rogowski coil 1 is positioned around the conductor C, the current in which it is desired to know. The voltage induced in the winding it proportional to the rate of change (derivative) of the current in the conductor.

The advantage of a Rogowski toroid relative to other types of current sensors is its good flexibility, mainly due to the absence of a rigid metallic core, a property which other current sensors have to little or no degree. This flexibility allows it to be wound around one or more phase conductors without constraint.

However, if the flexible open-core toroids of the Rogowski type have the desired mechanical properties, they nevertheless do not have performance compatible with all the fields of application, particularly for using this sensor in a neutral regime of the IT type, (impedance neutral) in which the measurement of differential currents is at a level that is often low and with low frequencies.

Devices are known with ferromagnetic cores, rather than air cores, allowing this disadvantage to be mitigated. These known types of toroids most often include a magnetic circuit with two rigid portions in which the performance corresponds the application need but having not only the disadvantages linked with their bulk and their rigidity, but also those linked to the presence of the two air gaps. To limit the effects of the air gap in the device, it is known that it is necessary, on the one hand, to increase bulk, i.e. increase the cross section of the magnetic circuit and, on the other hand, to polish the surfaces of the air gaps.

This solution has performance compatible with the fields of application, but the rigidity and the bulk of all known device prevent certain accessibility for measurement.

A known solution is proposed in patent EP 0 999 565. This consists of a current transformer comprising a coil wound around a magnetic circuit consisting of a stack of mutually free flat strips, lightly retained and fastened at each end. The magnetic circuit is electrically insulated from the coil; the transformer is configured to connect together the two ends of the magnetic circuit when the current transformer is closed around the electrical conductor on which the current measurement is to be carried out.

In a solution of this type, however, the magnetic circuit is not identically flexible in all the principal directions. However, the absence of the same flexibility in all principal directions does not allow easy installation of the measuring device.

Furthermore, the displacement of the strips causes variations in the apparent cross section of the magnetic core harmful to performance. However, control of the constancy of the cross section of the magnetic core allows repeatability of the measurement in any geometric configuration of the sensor.

In addition, the accuracy of a device of this type is low, especially for the measurement of currents of low intensity, to the extent that the measurement, even the detection of a current smaller than a few milliamperes is impossible.

Another known solution, based on the Neel effect, resolves the previously mentioned problems by using a magnetic core made of polymer filled with super-paramagnetic particles.

However, this solution has a high manufacturing cost.

Also known from document U.S. Pat. No. 5,235,488 is a current transformer comprising a magnetic circuit and a coil wound around the magnetic circuit, the magnetic circuit comprising a single magnetic wire wound in a tubular shape to form a tube intended to have an electrical conductor, in which an electrical current to be measured circulates, pass through it.

OBJECT AND SUMMARY OF THE INVENTION

The invention aims to mitigate the disadvantages mentioned above by proposing a current transformer equipped with a magnetic circuit that is identically flexible in all principal directions while retaining very low amplitude, low frequency electrical current measurement performance and low manufacturing cost.

In one object of the invention, an openable current transformer is proposed intended to close over an electrical conductor in which circulates an electrical current to be measured or over several electrical conductors in which circulate electrical currents, the vector sum of which it is desired to measure, the current transformer including a magnetic circuit and an electrically conducting coil wound around and electrically insulated from the magnetic circuit, the coil comprising a single winding or several distinct windings coupled in series.

According to a general feature of the invention, the magnetic circuit comprises a set of wires of magnetic material, the wires being assembled together in the form of a strand.

A device with a flexible magnetic core allows accessibility to measurement points in particularly confined or narrow locations. The assembly of the wires in the form of strands provides to the magnetic circuit, and by extension to the transformer, uniform flexibility in all directions, and thus flexibility identical to that of a metal cable.

Unlike a current transformer having a single magnetic wire wound to form a tube intended to be have the conductor to be measured pass through it, the invention comprises a plurality of distinct wires twisted together to form a magnetic cable around which is wound the electrically conducting coil, the cable having two ends which can be connected together to form a closed annular shape intended to have an electrical conductor to be measured pass through it.

According to a first aspect of the current transformer, the magnetic material of the wires can be an iron-nickel alloy with high magnetic permeability with at least 70% nickel, and preferably between 78 and 81% nickel.

The use of a high-permeability magnetic material suitably implemented as regards insulation between wires, magnetic annealing and control of the air gap, allows obtaining high sensitivity and accuracy.

The use of a material with high magnetic permeability as well as the implementation of meticulous manufacturing methods also allow guaranteeing elevated electrical characteristics in terms of accuracy and sensitivity.

According to a second aspect of the current transformer, the wires are mechanically insulated from one another by magnesium methylate, or by alumina ($Al_2O_3$) or magnesia (MgO) powder during their assembly to avoid adhesions between the wires.

The wires are free relative to one another. The device is thus easily deformable without losing its characteristics.

According to a third aspect of the current transformer, each wire comprises a plurality of threads of magnetic material twisted together in the form of a strand.

Each wire thus forms a strand of threads of magnetic material, the wires are then twisted together to form the cable of the magnetic circuit in the form of a strand of wires.

In one embodiment of the third aspect of the current transformer, the threads of each wire are mechanically insulated from one another by magnesium methylate, or by alumina ($Al_2O_3$) or magnesia (MgO) powder during their assembly to avoid adhesions between the threads of the wires.

Thus, inside each wire, the threads are free relative to one another, which improves the flexibility characteristics of the cable.

In another embodiment of the third aspect of the current transformer, each ply of the wires can have a diameter comprised between 0.1 mm and 0.5 mm and preferably a diameter of 0.20 mm.

According to a fourth aspect of the current transformer, the transformer can also comprise an electrically insulating flexible tubular inner sheath on which is wound said coil and in which the magnetic circuit is press-fit.

According to a fifth aspect of the current transformer, the transformer can also comprise an electrically insulating tubular outer sheath surrounding said coil to protect the coil from the external environment as well as from any external electrical contact and possible shock.

According to a sixth aspect of the current transformer, the coil can comprise a plurality of distinct windings coupled in series, at least two windings comprising enameled conducting wire, i.e. covered with an electrically insulating coating, and being radially superimposed to form a stack in a radial direction relative to the winding axis of the coil.

According to a seventh aspect of the current transformer, said at least one winding of the coil can comprise a copper electrical wire having a diameter comprised between 0.2 mm and 0.8 mm and preferably 0.4 mm.

The greater the diameter of the copper wire of the coil, the greater, and thus better, the ratio between the inductance and the resistance of the coil, this ratio influencing directly the accuracy of the current transformer.

According to an eighth aspect of the current transformer, the transformer can comprise closing means by ratchet locking or screwing.

In another object of the invention, a measuring device for an electrical current comprising an openable current transformer as defined above is proposed, and processing means electrically coupled to the coil of the current transformer.

BRIEF DESCRIPTION OF THE DRAWINGS

The invention will be better understood upon reading the following, by way of indication but without limitation, with reference to the appended drawings in which.

DETAILED DESCRIPTION OF EMBODIMENTS

Figure 1:
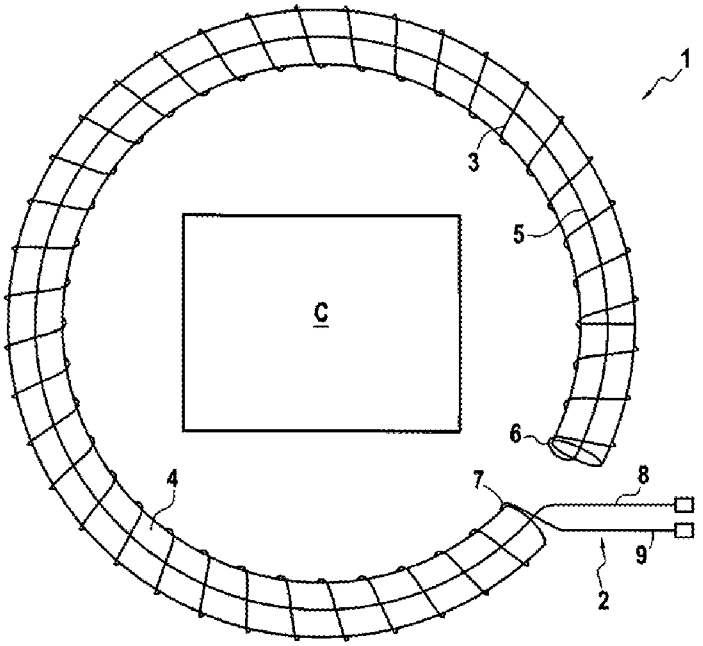
FIG.1 Prior art
FIG. 1, already described, shows schematically a Rogowski winding according to the prior art.
Figure 2:
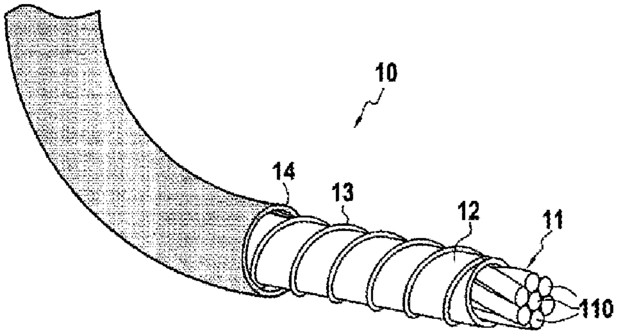
FIG. 2 shows schematically a partial perspective view with partial peeling of a current transformer 10 according to one embodiment of the invention.

In FIG. 2 is shown schematically a partial perspective view with partial peeling of a current transformer 10 according to one embodiment of the invention.

The current transformer 10 has the shape of an openable toroid intended to close over an electrical conductor in which an electrical current to be measured, alternating or direct, circulates, or over several electrical conductors in which electrical currents circulate of which the vector sum is to be measured.

The current transformer 10 comprises a magnetic circuit 11 inserted into an electrically insulating and flexible tubular inner sheath 12.

The magnetic circuit 11 is formed of a plurality of wires 110 of magnetic material, for example wires of an alloy comprising 15% iron, 80% nickel, and 5% molybdenum. In the embodiment illustrated in FIG. 2, the magnetic circuit 11 comprises seven wires 110. The seven wires 110 are assembled together in the form of a strand to form a cable. In other embodiments, the cable forming the magnetic circuit can comprise two wires or even several tens of wires.

Each wire 110 can be formed of a plurality of threads of magnetic material twisted together. Each wire 110 thus forms a strand of threads of magnetic material, and each strand formed by a wire 110 is assembled with other wires 110 of the magnetic circuit to form a strand of wires 110 forming the cable 11.

In the case where the wires are multi-ply wires, the threads from which the wires 110 are formed are manufactured of an iron-nickel-molybdenum alloy with high magnetic permeability having 80% nickel. The wires 110 can have cross sections of different sizes, for example a cross section of 4.6 $mm^2$.

In one exemplary embodiment, the cable of the magnetic circuit 11 can comprise several wires 110 each formed of several threads each having a diameter of approximately 0.2 mm to form a cable having an iron cross section of approximately 0.3 $cm^2$.

The number of threads in each wire 110 and the structure of the strand forming the magnetic cable 11, particularly the number of wires 110 composing the cable of the magnetic circuit 11, is adjustable depending on the sensitivity desired and the intended size of the cable for the magnetic circuit 11. The cable 11 is flexible in all directions thanks to its strand structure.

Following the mechanical formation of the strand of wires 110, the cable 11 undergoes heat treatment at high temperature in a reducing gas, such as hydrogen, so as to restore and optimize the magnetic performance of the material. The intrinsic permeability obtained in the embodiment of the invention illustrated in FIG. 2 is higher than $10^5$.

Each wire 110 is insulated geometrically and electrically prior to the annealing of the heat treatment phase of the cable 11, in order to avoid adhesions between the wires during the heat treatment. This insulation operation is accomplished using magnesium methylate or alumina ($Al_2O_3$) or magnesia (MgO) powder, or another technology, either by direct application to the wire prior to the formation of the strand of wires 110 forming the cable 11 or by application to the cable 11 after the formation of the strand of wires 110.

In the case where the wires 110 are multi-ply wires, in other words when each wire 110 is formed from a plurality of threads twisted together, the insulation operation is accomplished on the threads either before the formation of the wires or after the formation of the wires 110 by before the formation of the cable 11, or even after the formation of the cable 11, the treatment being a chemical treatment which can reach the entire surface of a ply by capillary action even after the cable has been formed. The insulation of each ply thus allows allowing sliding between the threads and thus improving the flexibility characteristics of the cable 11.

Figure 3:
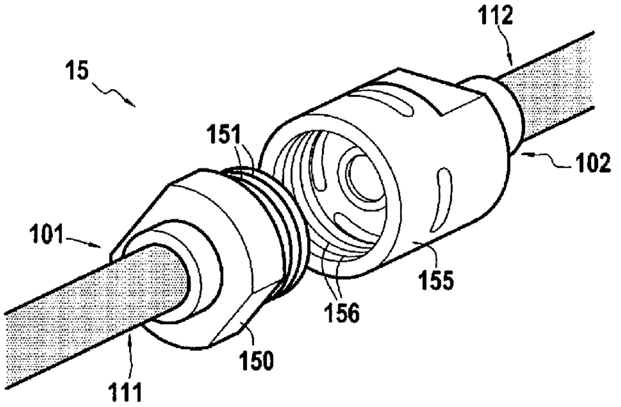
FIG. 3 shows schematically a view of the closing means of the current transformer according to one embodiment of the invention.
Figure 4:
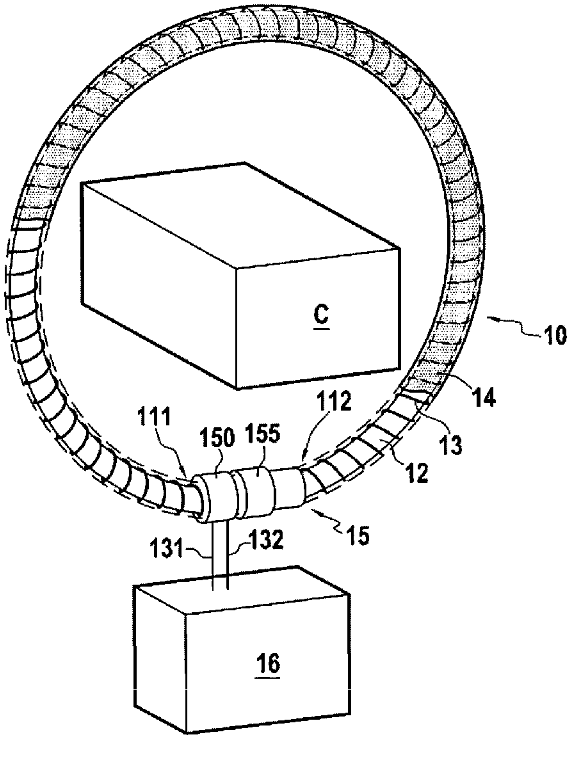
FIG. 4 shows schematically a measuring device for an electrical current comprising a current transformer according to one embodiment of the invention.

After the heat treatment, the cable 11 is then cut to the desired length and then has two ends 111 and 112. The two ends 111 and 112 of the cable 1 are crimped in order to retain the wires 110 together. The two cross sections at the ends 111 and 112 are intended to be facing and in contact when the current transformer 10 is closed, as illustrated in FIGS. 3 and 4 particularly, to form a closed magnetic circuit. The two cross sections at the ends 111 and 112 of the cable 11 are polished so as to optimize the air gap while ensuring good roughness, good parallelism and a zone with the least possible perturbation from the magnetic point of view.

The tubular inner sheath 12 forms a sleeve that the magnetic circuit 11, i.e. the cable, passes through axially, i.e. along the axis of revolution of the sheath 12. The inner sheath 12 is a tube of insulating material sufficiently strong to support the coil of copper wire with a diameter comprised in particular between 0.20 and 0.8 mm, while having sufficient flexibility to maintain that of the cable 11.

In one exemplary embodiment, the inner sheath 12 can be a tube of PVC, Rylsan® or other material, with an inner diameter comprised between 10 and 25 mm and a wall thickness comprised between 1 and 2 mm.

The current transformer 10 also comprises an electrically conducting coil 13. The inner sheath 12 forms a coil support for the coil 13. The coil 13 is formed of a copper wire wound back and forth around the inner sheath 12 over the entire length of the magnetic circuit 11. In other words, the coil 13 is wound firstly from the first end 111 of the cable until the second end 112 of the cable 11, then secondly from the second end 112 of the cable 11 until the first end 111 of the cable 11. The enameling of the copper wire allows insulating the wire and avoiding any short circuit, particularly between the superimposed portions.

Figure 5:
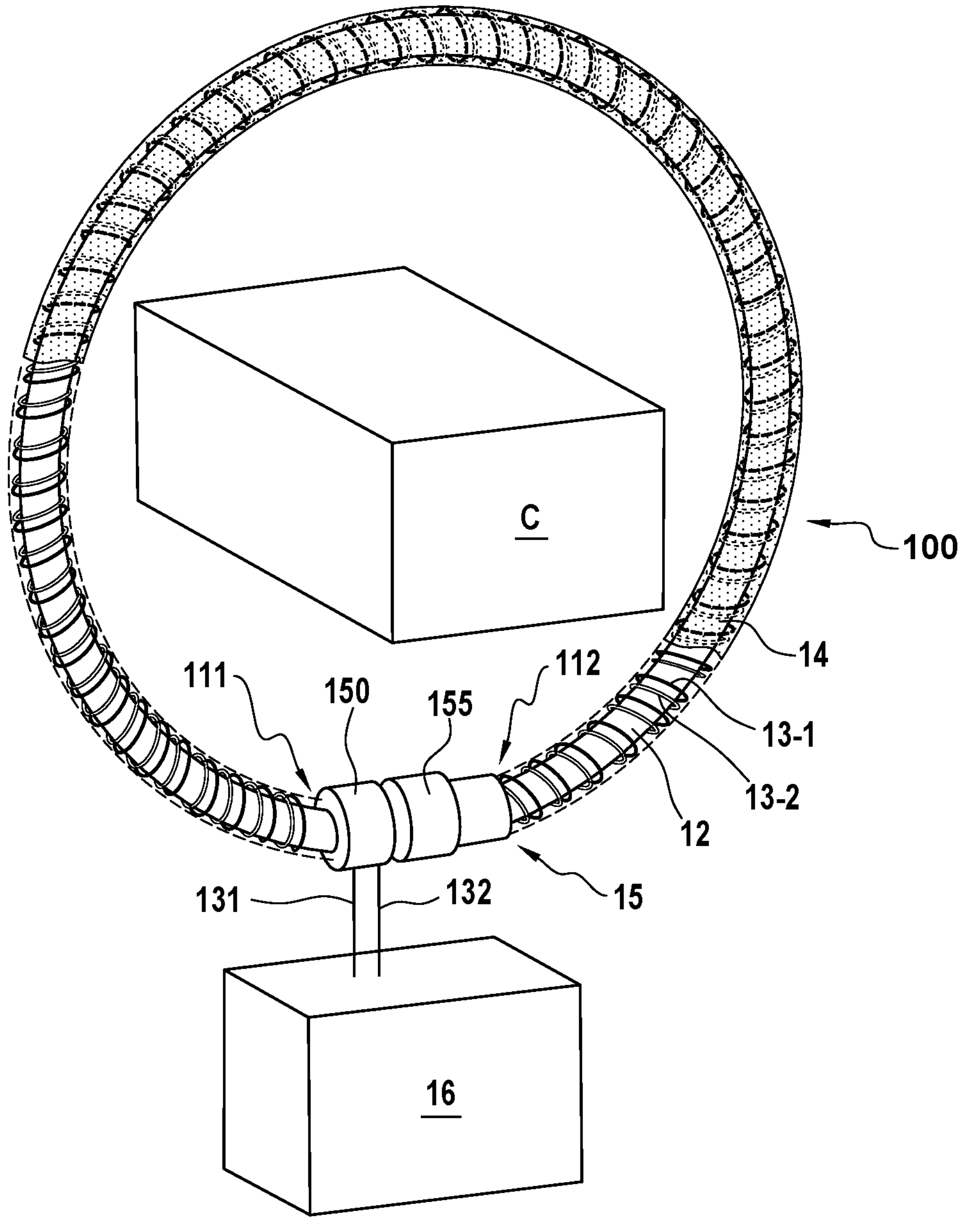
FIG. 5 shows schematically a measuring device for an electrical current comprising a current transformer according to another embodiment of the invention.

In one variant, the coil 13 can comprise a plurality of copper windings coupled together in series, as shown, for example, in FIG. 5.

The coil 13 has a first end 131 and a second end 132 opposite to the first end 131. The coil 13 being wound back and forth around the inner sheath 12, the first and second ends 131 and 132 of the coil 13 are located at the same end of the cable 11 which is the first end 111 of the cable 11 in the example illustrated in FIG. 4.

In one exemplary embodiment, the coil 13 can comprise 1000 turns wound regularly back and forth around the inner sheath 12 over a length which it is possible to adjust depending on the size of the primary conductors and which can be comprised between 200 and 2000 mm so as to constitute, after closing of the current transformer 10, loops the diameter of which is comprised between 70 and 700 mm.

The greater the diameter of the copper wire of the coil 13, the greater, and thus better, the ratio between the inductance and the resistance of the coil, this point being critical for the accuracy of the current transformer 10.

The current transformer 10 also comprises an electrically insulating tubular outer sheath 14. The outer sheath 14 is press-fit onto the assembly comprising the cable 11, the inner sheath 12 and the coil 13 so as to surround the coil 13 and insulate it from the external electrical environment of the current transformer 10.

FIG. 3 shows schematically a view of the means 15 for closing the current transformer 10 according to one embodiment of the invention.

As illustrated in FIG. 3, the current transformer 10 also comprises, in this embodiment, means 15 for closing by ratchet locking, comprising a male portion 150 mounted on a first end 101 of the current transformer 10 and a female portion 155 complementary to the male portion 150 and mounted on a second end 102 of the current transformer 10 opposite to the first end 101 of the current transformer 10. The first end 111 of the cable 11 and the first and second ends 131 and 132 of the coil 13 are located on the first end 101 of the current transformer 10 while the second end 112 of the cable 11 is located on the second end 102 of the current transformer 10. The female portion 155 comprises a tubular shape and circular grooves 156 formed on the radially internal surface of the tube of the female portion 155. The male portion 150 comprises a cylindrical shape configured to be inserted into the tubular shape of the female portion 155. The male portion 150 also comprises circular serrations configured to cooperate with the fluting 156 of the female portion 155 to close the current transformer 10.

In another embodiment, not shown, the current transformer can comprise means of closing by screwing.

The quality of the assembly is evaluated by measuring the magnetic permeability: with a sufficiently rigid closing device the permeability of the assembled open circuit can be comprised between 15,000 and 20,000. The closing device 15 is such that the sensor is easy to open without special tooling.

Shown schematically in FIG. 4 is a device for measuring an electrical current comprising an openable toroidal current transformer 10 and means of processing 16 electrically coupled to the two ends 131 and 132 of the coil 13. The processing means 16 allow receiving the current induced in the coil 13 of the current transformer 10 and thus accomplish measuring the electrical current passing through the electrical conductor around which the current transformer 10 has been closed.

The embodiment of another device for measuring an electrical current comprising an openable toroidal current transformer 100 is shown schematically in FIG. 5. The embodiment of FIG. 5 is similar to that shown in FIG. 4, with like components identified the same reference numbers. But in the embodiment of FIG. 5, the two ends 131 and 132 are coupled to a plurality of coil 13-1, 13-2 of distinct windings coupled in series, which are radially superimposed in a radial direction relative to the winding axis of the coils.

The invention thus supthreads a current transformer of the Rogowski type equipped with a magnetic circuit that is identically flexible in all principal directions, while retaining very low amplitude, low frequency electrical current measuring performance and low manufacturing cost, and a measuring device equipped with a current transformer of this type.

The invention claimed is:

1. An openable current transformer intended to close over at least one electrical conductor in which circulates an electrical current to be measured, the current transformer including a magnetic circuit and an electrically conducting coil wound around the magnetic circuit and electrically insulated from the magnetic circuit, said coil comprising a single winding or several distinct windings coupled in series, wherein said magnetic circuit comprises a set of wires of magnetic material, the wires being twisted together in the form of a strand to form a cable having uniform flexibility in all directions for the magnetic circuit, and wherein the coil comprises a plurality of distinct windings coupled in series, at least two windings comprising electrically insulating conducting wire and being radially superimposed to form a stack in a radial direction relative to the winding axis of the coil.

2. The current transformer according to claim 1, wherein the magnetic material of the wires is an iron-nickel alloy with high magnetic permeability with at least 70% nickel.

3. The current transformer according to claim 1, wherein the wires are geometrically and electrically insulated from one another by magnesium methylate, or by alumina or magnesia powder during their assembly to avoid adhesions between the wires.

4. The current transformer according to claim 1, also comprising an electrically insulating flexible tubular inner sheath on which is wound said coil and in which the magnetic circuit is press-fit.

5. The current transformer according to claim 1, also comprising an electrically insulating tubular outer sheath surrounding said coil.

6. The current transformer according to claim 1, wherein said at least one winding of the coil comprises a copper electrical wire having a diameter comprised between 0.1 mm and 0.8 mm.

7. The current transformer according to claim 1, comprising closing means by ratchet locking or screwing.

8. A measuring device for an electrical current comprising an openable current transformer according to claim 1, and processing means electrically coupled to the coil of the current transformer.

9. The current transformer according to claim 1, wherein the magnetic material of the wires is an iron-nickel alloy with high magnetic permeability with at least 78% to 81% nickel.

10. The current transformer according to claim 1, wherein said at least one winding of the coil comprises a copper electrical wire having a diameter comprised between 0.4 mm and 0.8 mm.

11. The current transformer according to claim 1, wherein each wire comprises a plurality of threads of magnetic material twisted together in the form of a strand.

12. The current transformer according to claim 11, wherein the threads of each wire are geometrically and electrically insulated from one another by magnesium methylate, or by alumina or magnesia powder during their assembly to avoid adhesions between the threads of the wires.

13. The current transformer according to claim 11, wherein each thread of the wire has a diameter comprised between 0.1 mm and 0.5 mm.

14. The current transformer according to claim 11, wherein each thread of the wire has a diameter comprised between 0.2 mm and 0.5 mm.

15. A current transformer configured to measure an electrical current that circulates in at least one electrical conductor, the current transformer comprising:

a magnetic circuit; and an electrically conducting coil wound around the magnetic circuit, the electrically conducting coil being electrically insulated from the magnetic circuit, wherein the electrically conducting coil includes a single winding or several distinct windings coupled in series, wherein said magnetic circuit includes a set of wires of magnetic material, the set of wires being twisted together in the form of a strand to form a cable, the cable having uniform flexibility in all directions for the magnetic circuit, wherein the current transformer is an openable current transformer configured to close over the at least one electrical conductor, and wherein the coil comprises a plurality of distinct windings coupled in series, at least two windings comprising electrically insulating conducting wire and being radially superimposed to form a stack in a radial direction relative to the winding axis of the coil.

16. The current transformer according to claim 15, further comprising an opener and closer portion, configured to provide for the current transformer to be opened and to close over the at least one electrical conductor.

* * * * *